United States Patent
Kozel et al.

(10) Patent No.: US 11,670,919 B2
(45) Date of Patent: Jun. 6, 2023

(54) THREE PHASE SWITCHGEAR OR CONTROL GEAR

(71) Applicant: ABB Schweiz AG, Baden (CH)

(72) Inventors: Tomas Kozel, Brno (CZ); Radek Javora, Hrusovany u Brna (CZ); Josef Cernohous, Jamne nad Orlici (CZ); Pavel Vrbka, Nedvedice (CZ); Christoph Budde, Heidelberg (DE); Christian Simonidis, Karlsruhe (DE); Sebastian Breisch, Neckarsteinach (DE); Harald Staab, Neckargemuend (DE)

(73) Assignee: ABB Schweiz AG, Baden (CH)

( * ) Notice: Subject to any disclaimer, the term of this patent is extended or adjusted under 35 U.S.C. 154(b) by 149 days.

(21) Appl. No.: 17/345,067

(22) Filed: Jun. 11, 2021

(65) Prior Publication Data
US 2021/0305789 A1 Sep. 30, 2021

Related U.S. Application Data

(63) Continuation of application No. PCT/EP2019/084673, filed on Dec. 11, 2019.

(30) Foreign Application Priority Data

Dec. 19, 2018 (EP) .................................. 18214214

(51) Int. Cl.
*H02B 13/025* (2006.01)
*H02B 13/00* (2006.01)
*H02B 13/02* (2006.01)

(52) U.S. Cl.
CPC ............. *H02B 13/00* (2013.01); *H02B 13/02* (2013.01); *H02B 13/025* (2013.01)

(58) Field of Classification Search
CPC .............................................. H02B 13/02–025
See application file for complete search history.

(56) References Cited

U.S. PATENT DOCUMENTS 6,518,531 B2 * 2/2003 Arioka ................ H02B 13/035
218/120
10,305,262 B2 * 5/2019 Johnson ................ H02B 1/306
(Continued)

FOREIGN PATENT DOCUMENTS

CN 103996990 A 8/2014
CN 104577747 A 4/2015
(Continued)

OTHER PUBLICATIONS

"Annex to the Communication", EPO Form 2906, European patent application No. 18213214.1, dated Feb. 1, 2023, 9 pages (Year: 2023).*

*Primary Examiner* — Robert J Hoffberg
(74) *Attorney, Agent, or Firm* — Leydig, Voit & Mayer, Ltd.

(57) ABSTRACT

A switchgear or control gear includes: at least one first compartment; a second compartment; a plurality of main switchgear or control gear components, the plurality of main switchgear or control gear components including a main busbar system, a three position linear or rotational movement disconnector, a circuit breaker, and a cable connection; and a plurality of auxiliary switchgear or control gear components, the plurality of auxiliary switchgear or control gear components including a disconnector drive and a circuit breaker drive. The plurality of main switchgear or control gear components are housed in the at least one first compartment. The plurality of auxiliary switchgear or control components are housed in the second compartment. The circuit breaker and three position or rotational movement (Continued)

disconnector are mounted vertically in the at least one first compartment.

10 Claims, 2 Drawing Sheets

(56) References Cited

U.S. PATENT DOCUMENTS

| | | | |
|---|---|---|---|
| 10,587,098 B2 * | 3/2020 | Johnson | H02B 1/306 |
| 11,121,529 B2 * | 9/2021 | Kozel | H01H 33/027 |
| 11,362,489 B2 * | 6/2022 | Kozel | H02B 3/00 |
| 11,451,015 B2 * | 9/2022 | Kozel | H02B 7/00 |
| 2017/0085064 A1 | 3/2017 | Cassimere et al. | |
| 2020/0127447 A1 | 4/2020 | Kozel et al. | |
| 2020/0127448 A1 | 4/2020 | Kozel et al. | |
| 2020/0130186 A1 | 4/2020 | Kozel et al. | |
| 2020/0136358 A1 | 4/2020 | Kozel et al. | |
| 2021/0305788 A1 * | 9/2021 | Kozel | H02B 1/26 |
| 2021/0313781 A1 * | 10/2021 | Cernohous et al. | H02B 13/0352 |

FOREIGN PATENT DOCUMENTS

| | | | |
|---|---|---|---|
| CN | 105071280 A | 11/2015 | |
| CN | 105229879 A | 1/2016 | |
| CN | 106159776 A | 11/2016 | |
| CN | 206595617 U | 10/2017 | |
| CN | 108666923 A | 10/2018 | |
| DE | 4103101 A1 | 9/1991 | |
| EP | 2953219 A1 | 12/2015 | |
| EP | 3641082 B1 * | 4/2022 | H02B 1/20 |
| JP | 2004064955 A * | 2/2004 | |
| JP | 2004187348 A * | 7/2004 | H02B 13/045 |
| JP | 2004336891 A * | 11/2004 | |
| JP | 2005304200 A * | 10/2005 | |
| WO | WO-2019224974 A1 * | 11/2019 | H02B 13/035 |

* cited by examiner

THREE PHASE SWITCHGEAR OR CONTROL GEAR

CROSS-REFERENCE TO PRIOR APPLICATIONS

This application is a continuation of International Patent Application No. PCT/EP2019/084673, filed on Dec. 11, 2019, which claims priority to European Patent Application No. EP 18 214 214.1, filed on Dec. 19, 2018. The entire disclosure of both applications is hereby incorporated by reference herein.

FIELD

The present invention relates to a three phase switchgear or control gear for low voltage, medium voltage or high voltage use within a substation.

BACKGROUND

In state-of-art switchgear and control gear (also called controlgear) designs the primary (main) circuits and auxiliary circuit are arranged in a manner that is not convenient for monitoring or maintenance.

US 2017/0085064 A1 describes a local equipment room (LER) for use in an industrial facility, having one or more robots to perform certain tasks, and the LER being filled with non-atmospheric fluid or gas.

Such robotic systems operate with the substation or switchgear or control gear and perform both monitoring and maintenance tasks. Such robotic systems can be quite complex and expensive, especially when considering variability existing in substations today. Even though robotic systems can reduce maintenance tasks in a substation with respect to switchgear or control gear, the robot itself may require considerable maintenance. This can require the robot to be removed from the substation, switchgear or control gear or the personnel entering the substation, switchgear or control gear and thus leads to substation shut down.

There is a need to address this issue.

SUMMARY

In an embodiment, the present invention provides a switchgear or control gear, comprising: at least one first compartment; a second compartment; a plurality of main switchgear or control gear components, the plurality of main switchgear or control gear components comprising a main busbar system, a three position linear or rotational movement disconnector, a circuit breaker, and a cable connection; and a plurality of auxiliary switchgear or control gear components, the plurality of auxiliary switchgear or control gear components comprising a disconnector drive and a circuit breaker drive, wherein the plurality of main switchgear or control gear components are housed in the at least one first compartment, wherein the plurality of auxiliary switchgear or control components are housed in the second compartment, and wherein the circuit breaker and three position or rotational movement disconnector are mounted vertically in the at least one first compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
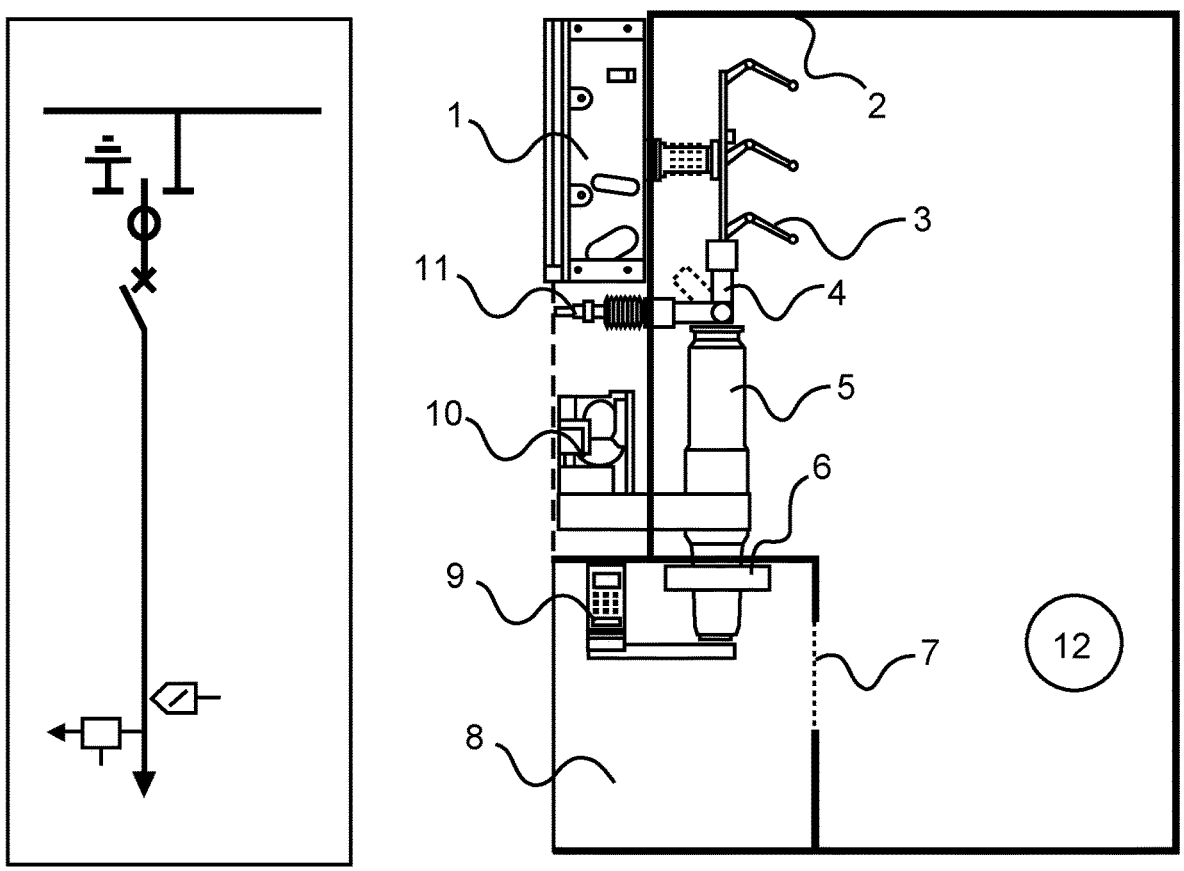
FIG. 1 shows an example of a switchgear or control gear.

In an embodiment, the present invention provides a better design of a switchgear or control gear.

In an aspect, there is provided a switchgear or control gear, comprising:

at least one first compartment;
a second compartment;
a plurality of main switchgear or control gear components; and
a plurality of auxiliary switchgear or control gear components.

The plurality of main switchgear or control gear components comprises a main busbar system, a three position linear or rotational movement disconnector, a circuit breaker (5), and a cable connection. The plurality of auxiliary switchgear or control gear components comprises a disconnector drive and a circuit breaker drive. The plurality of main switchgear or control gear components are housed in the at least one first compartment. The plurality of auxiliary switchgear or control components are housed in the second compartment. The circuit breaker and three position or rotational movement disconnector are mounted vertically in the at least one first compartment.

In an example, the circuit breaker and three position or rotational movement disconnector are mounted vertically one above the other in the at least one first compartment.

In an example, when the plurality of main switchgear or control gear components are de-energized the at least one first compartment is configured to enable an operator to access an interior of the at least one first compartment.

In an example, the disconnector drive and the circuit breaker drive are mounted vertically in the second compartment.

In an example, the disconnector drive and the circuit breaker drive are mounted vertically one above the other in the second compartment.

In an example, the at least one first compartment is arc proof.

In an example, the at least one first compartment comprises two compartments. A first compartment of the at least one first compartment is a cable connection compartment within which is housed a cable connection. A second compartment of the at least one first compartment houses the circuit breaker and the three position linear or rotational movement disconnector.

In an example, a voltage sensor and a current sensor are housed in the cable connection compartment.

In an example, at least one sensor is located in the cable connection compartment, and the at least one sensor is configured to monitor the components in the cable connection compartment.

In an example, at least one sensor is located in the second compartment of the at least one first compartment, and the at least one sensor is configured to monitor the components in the second compartment of the at least one first compartment.

In an example, the second compartment is open-sided on at least one side.

In an example, the at least one first compartment comprises at least one door or removable wall section.

In an example, a door or removable wall section is located in a wall segregating the cable connection compartment from the second compartment of the at least one first compartment.

In an example, the switchgear or control gear is configured such that the door or removable wall section must be in position to provide an arc proof segregation between the cable connection compartment and the second compartment of the at least one first compartment for a user to be able to at least partially enter the cable connection compartment when the components in the second compartment of the at least one first compartment are energized or operational.

In an example, the door is configured to operate automatically.

In an example, the cable connection compartment has at least one door or removal wall section in an exterior wall.

In an example, the second compartment of the at least one first compartment has at least one door or removal wall section in an exterior wall.

In an example, the second compartment of the at least one first compartment is sized such that a user can gain access to the interior of the second compartment of the at least one first compartment without being able to completely enter the second compartment of the at least one first compartment.

In an example, at least one sensor is located in the second compartment, and the at least one sensor is configured to monitor the components in the second compartment.

In an example, one or more of the plurality of auxiliary switchgear or control components are housed in a removable module within the second compartment.

Figure 2:
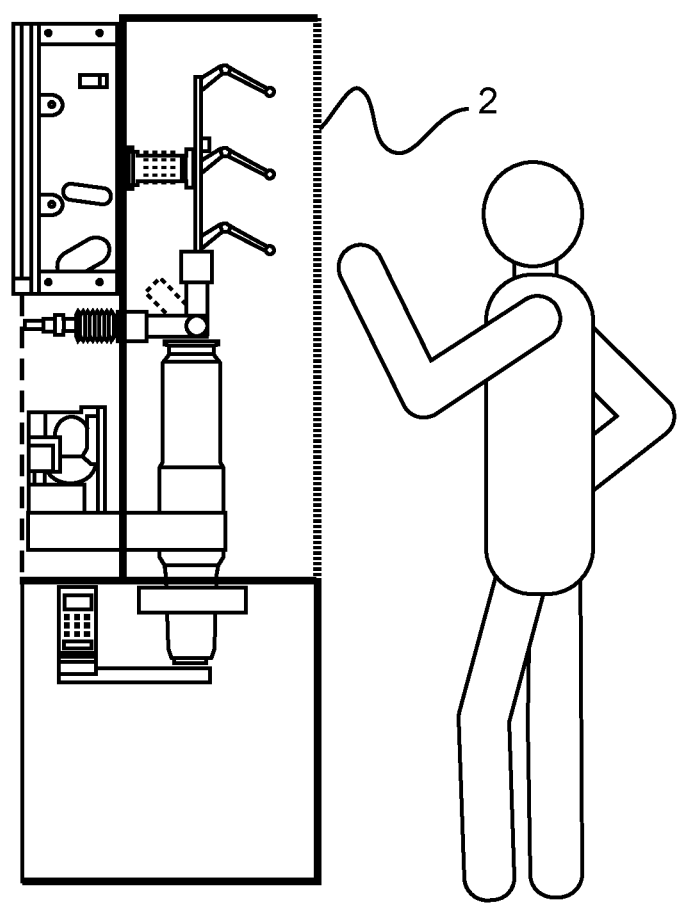
FIG. 2 shows an example of a switchgear or control gear.

FIGS. 1-2 show examples of a switchgear or control gear for operation in a low voltage, medium voltage or high voltage substation. In FIG. 2 a human operator is shown to the right of the switchgear or control panel, but they could equally be on the left gaining access to the components accessible from that side of the switchgear or control panel.

One example relates to a switchgear or control gear, comprising at least one first compartment 2, 8, 12, a second compartment 1, a plurality of main switchgear or control gear components, and a plurality of auxiliary switchgear or control gear components. The plurality of main switchgear or control gear components comprises a main busbar system 3, a three position linear or rotational movement disconnector 4, a circuit breaker 5, and a cable connection. The plurality of auxiliary switchgear or control gear components comprises a disconnector drive 11 and a circuit breaker drive 10. The plurality of main switchgear or control gear components are housed in the at least one first compartment. The plurality of auxiliary switchgear or control components are housed in the second compartment. The circuit breaker and three position linear or rotational movement disconnector are mounted vertically one above the other in the at least one first compartment.

It is to be noted that the description associated with FIGS. 1-2, could relate to one phase of a three phase system, and the components for the other two phases could similarly be housed in the at least one first compartment and the second compartment. Thus again auxiliary components for all three phases can be in the second compartment, and the main or primary components for all three phases be located in the at least one first compartment, but with the circuit breaker and disconnector for each mounted vertically. Thus, the description below can also relate to a three phase system, where the description as it relates to one phase could apply to all three phases. It is also to be noted, that for such a three phase system, segregating walls can be provided between components relating to the different phases.

According to an example, the circuit breaker and three position or rotational movement disconnector are mounted vertically one above the other in the at least one first compartment.

According to an example, when the plurality of main switchgear or control gear components are de-energized the at least one first compartment is configured to enable an operator to access an interior of the at least one first compartment.

According to an example, the disconnector drive 11 and the circuit breaker drive 10 are mounted vertically in the second compartment.

According to an example, the disconnector drive 11 and the circuit breaker drive 10 are mounted vertically one above the other in the second compartment.

Switchgear or control gear as described herein, wherein the at least one first compartment is arc proof.

According to an example, the at least one first compartment comprises two compartments 8, 12. A first compartment 8 of the at least one first compartment is a cable connection compartment within which is housed a cable connection. A second compartment 12 of the at least one first compartment houses the circuit breaker and the three position linear or rotational movement disconnector.

According to an example, a voltage sensor 9 and a current sensor 6 are housed in the cable connection compartment.

According to an example, at least one sensor is located in the cable connection compartment 8, and the at least one sensor is configured to monitor the components in the cable connection compartment.

According to an example, at least one sensor is located in the second compartment 12 of the at least one first compartment, and the at least one sensor is configured to monitor the components in the second compartment of the at least one first compartment.

According to an example, the second compartment is open-sided on at least one side.

According to an example, the at least one first compartment comprises at least one door or removable wall section.

According to an example, a door or removable wall section 7 is located in a wall segregating the cable connection compartment 8 from the second compartment 12 of the at least one first compartment.

According to an example, the switchgear or control gear is configured such that the door or removable wall section 7 must be in position to provide an arc proof segregation between the cable connection compartment and the second compartment of the at least one first compartment for a user to be able to at least partially enter the cable connection compartment when the components in the second compartment of the at least one first compartment are energized.

According to an example, the door is configured to operate automatically.

According to an example, the cable connection compartment has at least one door or removal wall section in an exterior wall.

According to an example, the second compartment 12 of the at least one first compartment has at least one door or removal wall section in an exterior wall.

According to an example, the second compartment of the at least one first compartment is sized such that a user can gain access to the interior of the second compartment of the at least one first compartment without being able to completely enter the second compartment of the at least one first compartment.

According to an example, at least one sensor is located in the second compartment 1, and the at least one sensor is configured to monitor the components in the second compartment.

According to an example, one or more of the plurality of auxiliary switchgear or control components are housed in a removable module within the second compartment.

Thus, a new substation development is provided, where switchgear or control gear has been designed allowing for a much simpler automation system to be designed for monitoring and maintenance tasks on the unmanned switchgear or controlgear.

To put this another way, components and switching devices on the primary circuit are arranged vertically, and could be one above the other, to facilitate better access to them for monitoring and maintenance, and can be arranged vertically, and in one plane if required. The auxiliaries of the switching devices can also be arranged vertically, and again one above the other as well, in one vertical plane if required. The auxiliaries are separated from the primary circuits by an arc proof wall to allow for human personnel access whilst the switchgear or controlgear is in operation. To prevent unauthorized access to the auxiliaries, a removable cover is provided in front of the switching devices auxiliaries. This facilitates maintenance of auxiliaries, via automation systems or humans, that may require more frequent maintenance than other components within the switchgear or control gear.

Continuing with the figures, specific features are now described.

FIG. 1 shows a detailed example of a switchgear or control gear, where for ease of reference the following features shown are listed:

1. Low-voltage compartment with auxiliary circuits;
2. Arc proof enclosure;
3. Main busbars, in three-phase arrangement;
4. Three position disconnector switch (connected/disconnected/earthed position);
5. Circuit breaker;
6. Current sensor;
7. Segregation cover—open when the feeder is in operation, closed automatically or manually when the external front cover to the cable connection box is open for human access. The segregation cover forms an arc proof segregation along with the cable connection box wall between the cable connection box and the main compartment for main circuits, when the segregation cover is in the closed position;
8. Cable connection box, accessible for operators by removing/opening a cover or door, that forms part of the arc proof enclosure when the cover/door is in position or closed;
9. Voltage sensor;
10. Circuit breaker drive and auxiliaries, accessible for operators by removing a cover or opening a door to the low-voltage compartment;
11. Disconnector switch drive and auxiliaries, accessible for operators by removing the cover or opening the door to the low-voltage compartment;
12. Main compartment providing a main circuit space, including space for an automation system.

As shown in FIG. 1 the primary circuits and devices are located in one common busbar and circuit breaker compartment 12, that can be opened and need not be segregated feeder by feeder with side walls, but can be segregated feeder by feeder with side walls. Any arc fault situation is preferably mitigated by active arc fault protection, and the arc duration limited to a level that does not allow the arc to burn uncontrollably. The cable compartment 8 of each feeder is in normal operation opened to the common busbar and circuit breaker compartment 12, while an automatically or manually operated arc proof segregation can be inserted to segregate the cable connection compartment from the rest of the switchgear in case a human operator needs to access to cable connections of a particular feeder. The cable compartments are segregated between feeders with side walls, but this is not essential.

For unmanned operation, the main busbar and circuit breaker space 12 is provided with an automation system that moves along the feeder line and monitors and/or maintains the switching devices, insulation, and joints on the primary circuit.

As shown in FIG. 1 the low-voltage compartment 1 can have at least one open side, but can be enclosed with walls that are removable. The auxiliaries of the switching devices are modularised in order to simplify maintenance tasks on the auxiliaries, through extracting a removable module from the low-voltage compartment housing the auxiliaries. Then either carrying out maintenance or repair on the auxiliaries and reinserting the same module, or immediately replacing the module with a module housing the same auxiliaries and then later carrying out maintenance or repair on the auxiliaries in the module that was first extracted.

In FIG. 1 a door or removable cover separates the cable connection compartment 8 from the main circuit compartment 12. However, the cable compartment 8 can be permanently segregated from the common busbar and circuit breaker compartment (main compartment 12), and where there is no such door or removable cover. One or more fixed sensors can be installed in each compartment for monitoring, however such monitoring and maintenance tasks can be carried out by human operators.

As shown in FIG. 2, the switchgear or control gear can have a design where the depth of the common main busbar and circuit breaker compartment 12 has been shrunk to a minimum, while still enabling the human operator to access the interior via a removable cover or door.

It is to be noted that a circuit breaker pole design of the switchgear or controlgear can have primary connections on the pole side, instead of the pole having top and bottom primary connections. The primary connections on such a pole can then face the main compartment space 12, thereby facilitating access by an automation system.

In FIG. 1 a rotational three position disconnector switch is shown, but a disconnector switch with linear movement can be used instead.

The primary circuit can include other components and devices not described in FIG. 1, such as earthing switch, voltage indication, surge arrestors, Ultra Fast Earthing Switch (UFES), IS-limiters (as invented by ABB Calor Emag in 1955), contactors, load-break switches, fuses.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switchgear, comprising:
   at least one first compartment, being configured to be arc proof and comprising:
   a second compartment that is a cable connection compartment; and
   a third compartment;
   a fourth compartment;
   a plurality of main switchgear or control gear components housed in the at least one first compartment, the plurality of main switchgear or control gear components comprising:
   a main busbar system,
   a three position linear or rotational movement disconnector, and
   a circuit breaker;
   a cable connection, the cable connection housed in the second compartment, and the circuit breaker and the three position linear or rotational movement disconnector are mounted vertically one above the other in the third compartment; and
   a plurality of auxiliary switchgear or control gear components, the plurality of auxiliary switchgear or control gear components comprising a disconnector drive and a circuit breaker drive, the disconnector drive and the circuit breaker drive being mounted vertically one above the other in the fourth compartment;
   wherein an interior door is located in a wall segregating the second compartment from the third compartment, wherein the switchgear is configured such that the interior door must be in position to provide an arc proof segregation between the second compartment and the third compartment for a user to be able to at least partially enter the second compartment when any components, including the three position linear or rotational movement disconnector and the circuit breaker, in the third compartment are energized, and wherein the interior door is configured to operate automatically,
   wherein the second compartment has an exterior door or removal wall section in an exterior wall of the second compartment,
   wherein the interior door located in the wall segregating the second compartment from the third compartment closes automatically when the exterior door or removable wall section in the exterior wall of the second compartment is open.

2. The switchgear according to claim 1, wherein, when the plurality of main switchgear or control gear components are de-energized, the at least one first compartment is configured to enable the user to access an interior of the at least one first compartment.

3. The switchgear according to claim 1, wherein a voltage sensor and a current sensor are housed in the second compartment.

4. The switchgear according to claim 1, wherein:
   at least one sensor is located in the second compartment, and
   the at least one sensor is configured to monitor components, including the cable connection, in the second compartment.

5. The switchgear according to claim 1, wherein:
   at least one sensor is located in the third compartment, and
   the at least one sensor is configured to monitor the components in the third compartment.

6. The switchgear according to claim 1, wherein the fourth compartment is open-sided on at least one side.

7. The switchgear according to claim 1, wherein the third compartment has at least another door or removal wall section in an exterior wall of the third compartment.

8. The switchgear according to claim 1, wherein the third compartment is sized such that the user can gain access to the interior of the third compartment without being able to completely enter the third compartment.

9. The switchgear according to claim 1, wherein:
   at least one sensor is located in the fourth compartment, and
   the at least one sensor is configured to monitor components, including the disconnector drive and the circuit breaker drive, in the fourth compartment.

10. The switchgear according to claim 1, wherein one or more of the plurality of auxiliary switchgear or control components are housed in a removable module within the fourth compartment.

* * * * *